United States Patent
Shi (10) Patent No.: US 10,773,444 B2
(45) Date of Patent: Sep. 15, 2020

(54) CONTINUOUS SCREEN CHANGER, SCREEN CHANGING DEVICE, AND EXTRUDER

(71) Applicant: ZHE JIANG HOUPU TECHNOLOGY CO., LTD., Taizhou, Zhejiang (CN)

(72) Inventor: Xiaohe Shi, Zhejiang (CN)

(73) Assignee: ZHE JIANG HOUPU TECHNOLOGY CO., LTD., Taizhou (CN)

( * ) Notice: Subject to any disclaimer, the term of this patent is extended or adjusted under 35 U.S.C. 154(b) by 187 days.

(21) Appl. No.: 16/071,230

(22) PCT Filed: Aug. 15, 2016

(86) PCT No.: PCT/CN2016/095225
§ 371 (c)(1),
(2) Date: Jul. 19, 2018

(87) PCT Pub. No.: WO2017/124734
PCT Pub. Date: Jul. 27, 2017

(65) Prior Publication Data
US 2019/0381714 A1 Dec. 19, 2019

(30) Foreign Application Priority Data
Jan. 20, 2016 (CN) .......................... 2016 1 0038974

(51) Int. Cl.
*B29C 48/691* (2019.01)
*B29C 48/25* (2019.01)
(Continued)

(52) U.S. Cl.
CPC ...... *B29C 48/6916* (2019.02); *B29C 48/2545* (2019.02); *B29C 48/273* (2019.02); *B29C 48/6914* (2019.02); *B29C 48/694* (2019.02)

(58) Field of Classification Search
CPC .................. B29C 48/6914; B29C 48/6916
See application file for complete search history.

(56) References Cited

U.S. PATENT DOCUMENTS

| 6,261,079 B1 | 7/2001 | Ishida |
| 2006/0157879 A1* | 7/2006 | Gneuss .................. B01D 29/01 264/40.1 |

(Continued)

FOREIGN PATENT DOCUMENTS

| CN | 203485420 | 3/2014 |
| CN | 204249323 | 4/2015 |

(Continued)

OTHER PUBLICATIONS

Translation of DE 10 2007 006 072 ("Rielmann") (Year: 2008).*

(Continued)

*Primary Examiner* — Xiao S Zhao
*Assistant Examiner* — John J Derusso
(74) *Attorney, Agent, or Firm* — Nixon & Vanderhye PC (57) ABSTRACT

A continuous screen changer, including: an external shell having an internal cavity, and an internal drum. The external shell is provided with a feed port, a screen changing port, and a discharge port. The internal drum is provided with at least four filter screen mounting grooves and material flow passages correspondingly communicating with the filter screen mounting grooves. A sealing wall hermetically connected with the internal cavity is formed between each two adjacent filter screen mounting grooves. Whichever of the filter screen mounting grooves is opposite to the feed port rotates to be opposite to the screen changing port in a rotation process, and whichever of the filter screens is on said filter screen mounting groove opposite to the screen changing port is changed at the screen changing port

6 Claims, 6 Drawing Sheets

(51) Int. Cl.
*B29C 48/27* (2019.01)
*B29C 48/694* (2019.01)

(56) References Cited

U.S. PATENT DOCUMENTS

2010/0200479 A1* 8/2010 Yang .................. B01D 29/01
264/40.1
2013/0270170 A1 10/2013 Jost et al.

FOREIGN PATENT DOCUMENTS

| CN | 105522711 | 4/2016 | | |
|---|---|---|---|---|
| CN | 205364467 | 7/2016 | | |
| DE | 102007006072 A1 * | 8/2008 | ......... | B29C 48/2554 |
| DE | 10 2013 206 949 | 7/2014 | | |
| JP | 47-8940 | 2/1971 | | |
| JP | 2001-038792 | 2/2001 | | |
| JP | 2004-34423 | 2/2004 | | |
| JP | 2012-239999 | 12/2012 | | |
| JP | 2013-536061 | 9/2013 | | |

OTHER PUBLICATIONS

Translation of DE 10 2013 206 949 ("Yang") (Year: 2014).*
International Search Report for PCT/CN2016/095225 dated Oct. 21, 2016, 4 pages.
Machine translation of Office Action dated Jun. 25, 2019, issued in Japanese Application No. 2018-557168 (4 pages).

* cited by examiner

CONTINUOUS SCREEN CHANGER, SCREEN CHANGING DEVICE, AND EXTRUDER

This application is the U.S. national phase of International Application No. PCT/CN2016/095225 filed Aug. 15, 2016 which designated the U.S. and claims priority to CN Patent Application No. 201610038974.8 filed Jan. 20, 2016, the entire contents of each of which are hereby incorporated by reference.

TECHNICAL FIELD

The present application relates to the technical field of extrusion molding apparatuses, and in particular, to a continuous screen changer, a screen changing device, and an extruder.

BACKGROUND

There are mainly two types of existing screen changers of an extruder, i.e., a manual screen changer and a hydraulic pull-type screen changer. The manual screen changer is operated by first shutting down the extruder and then taking out a filter screen in the screen changer for change. However, the hydraulic pull-type screen changer is operated by pushing and pulling the filter screen left and right for change. When the filter screen is changed, the extrusion materials on the extruder are interrupted, causing interruption of continuous production, which directly affects normal production of the extruder, and meanwhile also produces a certain amount of waste materials. Therefore, the foregoing two types of existing screen changers of the extruder mainly have the following shortcomings: during change of filter screens, manual intervention is required, automation cannot be achieved, and it takes time, efforts and materials; moreover, the production process will be interrupted, the efficiency of production is directly affected, and there is a possibility of air entering the material, reducing the quality of a product.

SUMMARY

An objective of the present application is to provide a continuous screen changer, a screen changing device, and an extruder capable of implementing continuous change of filter screens to solve the shortcomings in the prior art.

To achieve the foregoing objective:

The first technical solution of the present application is as follows: a continuous screen changer for changing filter screens includes an external shell with an internal cavity and an internal drum accommodated in the internal cavity and rotating relative to the external shell; the external shell is provided with a feed port and a screen changing port located at two opposite sidewalls of the external shell and communicating with the internal cavity, as well as a discharge port located at one end of the external shell and communicating with the internal cavity; the internal drum is provided with at least four filter screen mounting grooves uniformly distributed at a peripheral surface of the internal drum for mounting the filter screens, and material flow passages corresponding to the filter screen mounting grooves in position and communicating with the filter screen mounting grooves; a sealing wall hermetically connected with an internal wall of the internal cavity is formed between each two adjacent filter screen mounting grooves; after entering the internal cavity along the feed port and being filtered by the filter screen, materials flow out of the discharge port along the material flow passages in the filter process; and the filter screen mounting groove opposite to the feed port rotates to be opposite to the screen changing port in the rotation process, and the filter screen on the filter screen mounting groove is changed at the screen changing port.

Preferably, the filter screen mounting grooves include a working slot communicating with the feed port during rotation of the internal drum, a screen changing slot opposite to the working slot and communicating with the screen changing port for changing the filter screen, and a preparation slot and a waste slot which are located between the working slot and the screen changing slot.

Preferably, the internal drum includes partition walls located between the material flow passages and the corresponding filter screen mounting grooves and provided with material flow holes, and the material flow holes communicate the material flow passages and the filter screen mounting grooves.

Preferably, an auxiliary block detachably connected with the external shell is provided at the side of the external shell; a connection passage includes an upper transverse passage communicating with the working slot, a lower transverse passage communicating with the preparation slot, and a vertical passage communicating the upper transverse passage and the lower transverse passage and formed between the external shell and the auxiliary block.

Preferably, the other end of the external shell is provided with a sealing plate for sealing an opening at one end of the each of the material flow passages.

Preferably, the material flow passages and the corresponding filter screen mounting grooves communicate one another through material flow holes formed in the internal drum.

Preferably, the material flow holes include several small round holes uniformly distributed in arrays.

The present application achieves the following advantages: According to the continuous screen changer of the present application, since the internal drum can rotate in the inner cavity, after the internal drum is controlled to rotate by a certain angle, one of the filter screen mounting grooves corresponds to the feed port, and the materials pass through the filter screen mounted on the filter screen mounting groove from the feed port for effective filtration, the filtered materials enter the material flow passage below the filter screen mounting groove, the end of the material flow passage communicates with the discharge port, and the filtered materials finally flow out of the discharge port. Since at least four filter screen mounting grooves are provided, whenever the filter screen in the filtering operation is detected to be blocked, the internal drum is controlled to rotate to the next filter screen mounting groove, in which the filter screen is mounted, corresponding to the feed port, and it continues filtering the materials. At the same time, another filter screen mounting groove would be corresponding to the screen changing port, a worker can change the filter screen in the filter screen mounting groove, and there has at least one filter screen mounting groove that waits for abutting against the feed port and further has one filter screen mounting groove that waits for abutting against the screen changing port, so the shutdown is not required when the filter screen is changed, and the continuous and uninterrupted change of the filter screens is implemented, and thus the apparatus to which the continuous screen changer is applied can continuously work.

The second technical solution of the present application is as follows: a screen changing device includes a driving mechanism and the foregoing continuous screen changer;

and the driving mechanism is connected with the internal drum and drives the internal drum to rotate relative to the external shell.

Preferably, the driving mechanism includes a motor, a reduction gear, a coupler and a center shaft; a shaft hole is formed in the middle part of the internal drum along the axial direction; the center shaft is cooperatively connected with the shaft hole; and a spindle of the motor is connected with an input end of the reduction gear, and an output end of the reduction gear is connected with the center shaft through the coupler.

According to the screen changing device of the present application, when the filter screens require to be changed, the power of the motor is reduced by the reduction gear and then is transferred to the center shaft through the coupler, the center shaft drives the internal drum to rotate so that the position of one of the filter screen mounting grooves corresponds to that of the feed port, and at the same time, the position of another filter screen mounting groove corresponds to that of the screen changing port. The filter screen mounted in one filter screen mounting groove is maintained to work all the time, and the filter screen mounted in one filter screen mounting groove can be changed, so that the continuous and uninterrupted change of the filter screens is implemented and thus the apparatus to which the screen changing device is applied can continuously work.

The third technical solution of the present application is as follows: an extruder includes an extrusion device and the foregoing screen changing device; and a discharge end of the extrusion device is connected with the feed port.

According to the extruder of the present application, since the foregoing screen changing device is used, the extrusion device does not need to be stopped during change of the filter screens, so that continuous and uninterrupted work can be implemented, thereby greatly improving production efficiency and production quality.

Reference numerals include: 10-External shell; 11-Internal cavity; 12-Feed port; 13-Discharge port; 14-Screen changing port; 15-Connection passage; 16-Auxiliary block; 17-Sealing plate; 20-Internal drum; 21-Filter screen mounting groove; 21*a*-Working slot; 21*b*-Waste slot; 21*c*-Screen changing slot; 21*d*-Preparation slot; 22-Material flow passage; 23-Sealing wall; 24-Material flow hole; 25-Shaft hole; 26-Partition wall; 30-Driving mechanism; 31-Motor; 32-Reduction gear; 33-Coupler; 34-Center shaft; 40-Filter screen; 151-Upper transverse passage; 152-Vertical passage; and 153-Lower transverse passage.

DESCRIPTION OF EMBODIMENTS

To make the objectives, technical solutions, and advantages of the present application clearer and more comprehensible, the present application will be described below in detail with reference to FIGS. 1-6 and embodiments. It should be understood that the specific embodiments described herein are merely used to explain the present application but are not intended to limit the present application.

It should be noted that orientation wordings such as left, right, upper, lower, top, and bottom in the embodiments are merely relative concepts or are based on the normal service condition of the product, and should not be considered restrictive.

As shown in FIG. 1 to FIG. 5, an embodiment of the present application provides a continuous screen changer for changing filter screens 40, including an external shell 10 with an internal cavity 11 and an internal drum 20 accommodated in the internal cavity 11 and rotating relative to the external shell 10; the external shell 10 is provided with a feed port 12 and a screen changing port 14 located at two opposite sidewalls of the external shell 10 and communicating with the internal cavity 11, as well as a discharge port 13 located at one end of the external shell 10 and communicating with the internal cavity 11; the internal drum 20 is provided with at least four filter screen mounting grooves 21 uniformly distributed at a peripheral surface of the internal drum 20 for mounting the filter screens 40, and material flow passages 22 corresponding to the filter screen mounting grooves 21 in position and communicating with the filter screen mounting grooves 21; a sealing wall 23 hermetically connected with an internal wall of the internal cavity 11 is formed between each two adjacent filter screen mounting grooves 21; after entering the internal cavity 11 along the feed port 12 and being filtered by the filter screen 40, materials flow out of the discharge port 13 along the material flow passages 22 in the filter process; and the filter screen mounting groove 21 opposite to the feed port 12 rotates to be opposite to the screen changing port 14 in the rotation process, and the filter screen 40 on the filter screen mounting groove 21 is changed at the screen changing port 14. That is to say, when one filter screen mounting groove 21 completely corresponds to the feed port 12, another filter screen mounting groove 21 completely corresponds to the screen changing port 14 all the time, so that when the filter screen 40 mounted in one filter screen mounting groove 21 filters, the filter screen 40 mounted in another filter screen mounting groove 21 can be changed all the time.

In this embodiment, the continuous screen changer is mainly applied to an extruder for filtering some melt plastic materials before extrusion molding. In other embodiments, the continuous screen changer can also be applied to other apparatuses requiring filtering, not listed one by one herein.

According to the continuous screen changer of the present application, before use, a filter screen 40 is first mounted in each filter screen mounting groove 21 and can be bent to a certain extent so that the filter screen 40 may be adaptive to the shape of the filter screen mounting groove 21 through bending; then, the bent filter screen 40 is embedded into the filter screen mounting groove 21; and then the internal drum 20 is rotated to make the filter screen mounting grooves 21 completely correspond to the screen changing ports 14 one by one. In this way, the filter screens 40 can be mounted in the filter screen mounting grooves 21.

When the continuous screen changer of this embodiment works, the materials are squeezed in from the feed port 12 of the external shell 10; since the internal drum 20 can rotate in the internal cavity 11, after the internal drum 20 is controlled to rotate by a certain angle, one of the filter screen mounting grooves 21 corresponds to the feed port 12, the materials pass through the filter screen 40 mounted on the filter screen mounting groove 21 from the feed port 12 for effective filtration, the filtered materials enter the material flow passage 22 below the filter screen mounting groove 21, the end of the material flow passage 22 communicates with the discharge port 13, and the filtered materials finally flow out of the discharge port 13.

Since at least four filter screen mounting grooves 21 are provided, whenever the filter screen 40 in the filtering operation is detected to be blocked, the internal drum 20 is controlled to rotate to the next filter screen mounting groove 21, in which the filter screen 40 is mounted, corresponding to the feed port 12, and it continues filtering the materials. At the same time, another filter screen mounting groove 21 would be corresponding to the screen changing port 14, a worker can change the filter screen 40 in the filter screen mounting groove 21, and there has at least one filter screen mounting groove 21 that waits for abutting against the feed port 12 and further has one filter screen mounting groove 21 that waits for abutting against the screen changing port 14. Moreover, since the blocking of the filter screen 40 generally requires thirty minutes to two hours, this period of time is also enough to change the filter screen 40 by the worker, and therefore, there is sufficient time for the worker to change the filter screen 40, ensuring that shutdown is not required when the filter screen 40 is changed to implement the continuous and uninterrupted change of the filter screens 40.

In this embodiment, the extruder to which the continuous screen changer is applied can continuously work.

Figure 1:
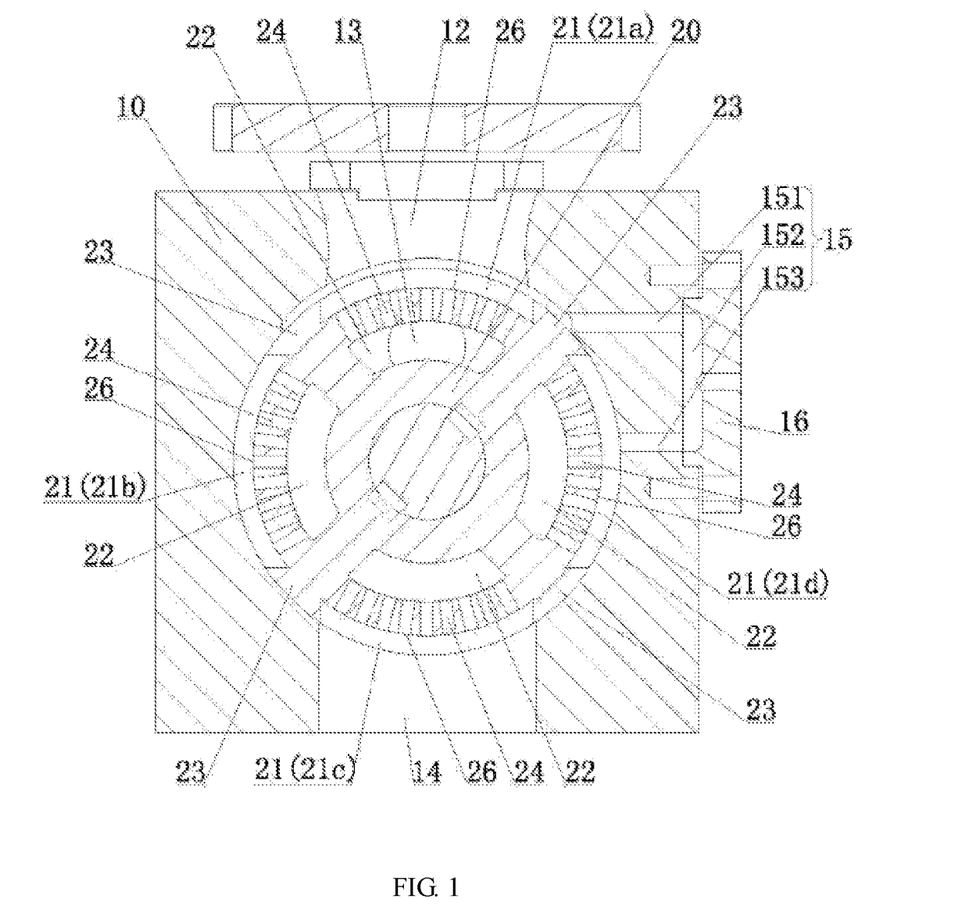
FIG. 1 is a section view of a continuous screen changer of the present application.
Figure 2:
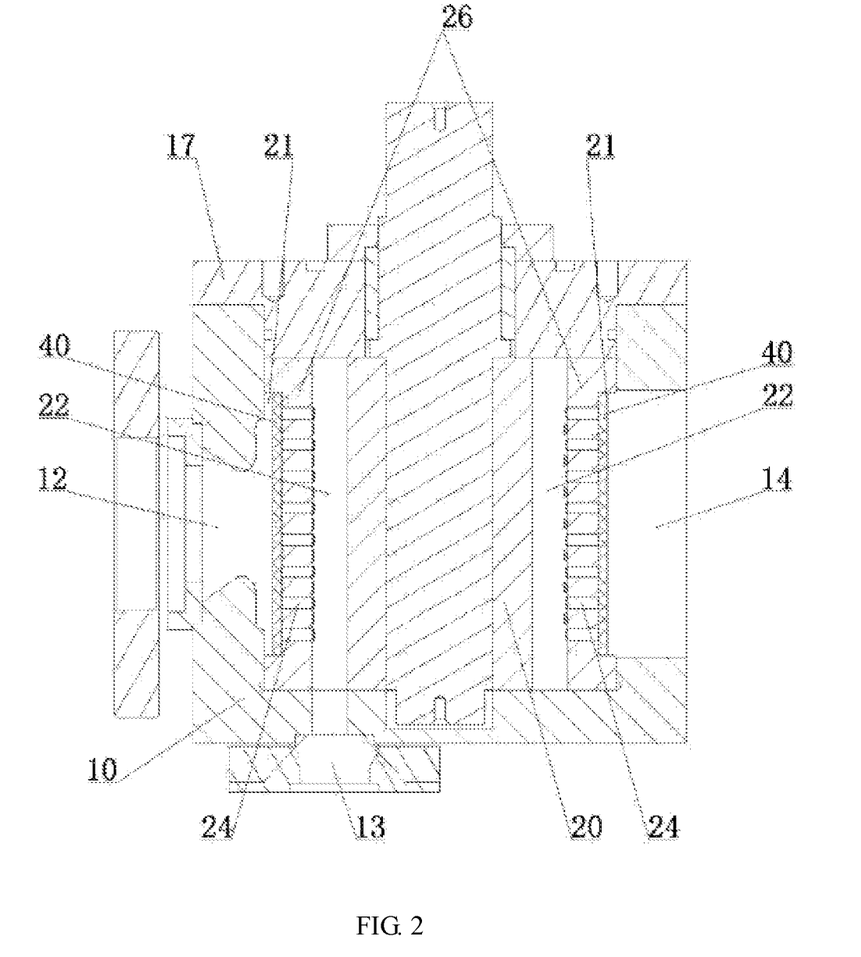
FIG. 2 is a section view of a continuous screen changer of the present application in another direction.
Figure 3:
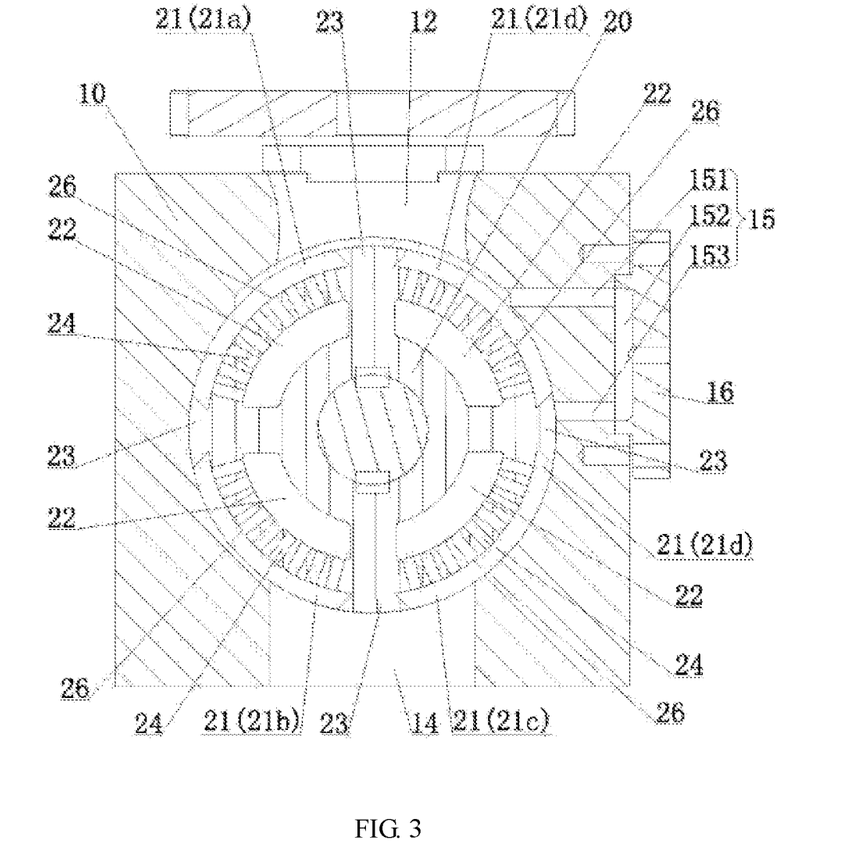
FIG. 3 is a section view of an internal drum in FIG. 1 after rotating by a certain angle.
Figure 4:
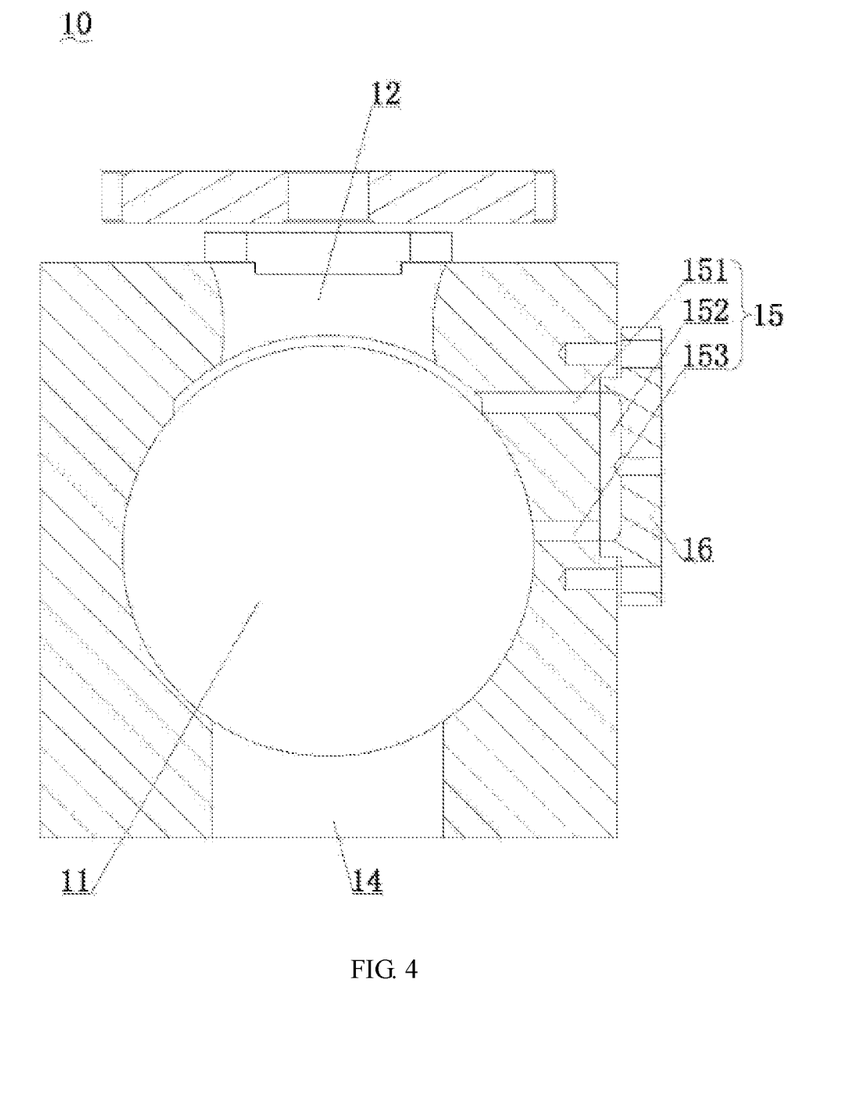
FIG. 4 is a section view of an external shell of the continuous screen changer of the present application.

In addition, as shown in FIGS. 1-3, the cross section of the end, hermetically connected to the internal wall of the internal cavity 11, of the sealing wall 23 in this embodiment is of a trapezoidal shape, so that two inner sides of the cross sections of the filter screen mounting grooves 21 at two sides of the sealing wall 23 form an inclined plane, and the inclined plane is cooperatively connected with the filter screen 40, thereby enhancing the mounting stability of the filter screen 40.

More specifically, material flow passages 22 correspondingly formed below the filter screen mounting grooves 21 are independent flow passages, and do not communicate with each other; in this way, when one of the material flow passages 22 works, other material flow passages 22 would not be affected, ensuring leak tightness among the material flow passages 22, avoiding occurrence of material leakage when the filter screen 40 is changed, and guaranteeing safety and orderly production while avoiding material waste.

A further detailed description is as follows: As shown in FIG. 1 and FIG. 3, in this embodiments, four filter screen mounting grooves 21 are preferably provided; when the internal drum 20 is rotated, in the four filter screen mounting grooves 21, a working slot 21a corresponds to the position of the feed port 12, a screen changing slot 21c corresponds to the position of the screen changing port 14, and a waste slot 21b and a preparation slot 21d are located between the working slot 21a and the screen changing slot 21c and are opposite to one another. Specifically, the four filter screen mounting grooves 21 distributed in an anticlockwise sequence are the working slot 21a, the waste slot 21b, the screen changing slot 21c, and the preparation slot 21d, respectively; the working slot 21a, the waste slot 21b, the preparation slot 21d and the screen changing slot 21c are mounted with filter screens 40 during working; when a system controls the internal drum 20 to rotate, also taking anticlockwise rotation for example, the filter screen mounting groove 21 corresponding to the feed port 12 is the working slot 21a, the filter screen mounting groove 21 corresponding to the screen changing port 14 is the screen changing slot 21c, and the left side and/or right side of the working slot 21a and the screen changing slot 21c are the waste slot 21b and the preparation slot 21d respectively, where the waste slot 21b prepares to rotate to correspond to the screen changing port 14, so as to become the screen changing slot 21c, while the preparation slot 21d prepares to rotate to correspond to the feed port 12, so as to become the working slot 21a; however, when the filter screen 40 in the original working slot 21a is blocked, the working slot 21a rotates to become the waste slot 21b; and after the filter screen 40 in the original screen changing slot 21c is changed, the screen changing slot 21c rotates to become the preparation slot 21d. The working slot 21a, the waste slot 21b, the screen changing slot 21c, and the preparation slot 21d would alternate and change positions after each rotation, and are changed in real time to ensure that the filter screen 40 in one of the filter screen mounting grooves 21 filters all the time when the filter screen 40 mounted in each filter screen mounting groove 21 is changed due to blocking, and the filter screens are continuously and uninterruptedly changed, thereby implementing the continuous filtering.

Of course, four filter screen mounting grooves 21 in this embodiment are a preferred embodiment. In other embodiments, there may be five, six, seven, or eight filter screen mounting grooves 21, and the filter screen mounting grooves 21 are uniformly arranged. In this way, it may form filter screen mounting grooves 21 having at least two waste slots 21b and/or at least two preparation slots 21d.

In this embodiment, as shown in FIG. 1 and FIG. 3, the external shell 10 is further provided with a connection passage 15 for communicating the working slot 21a and the preparation slot 21d. Specifically, since materials enter the filter screen mounting groove 21 that belongs to the working slot 21a and is corresponding to the feed port 12 at the beginning of work, when the filter screen 40 mounted in the working slot 21a is blocked, the internal drum 20 is rotated to rotate the filter screen mounting groove 21 that belongs to the preparation slot 21d to correspond to the feed port 12, and thus the filter screen mounting groove 21 that belongs to the preparation slot 21d becomes the working slot 21a. In this way, in order to guarantee that the preparation slot 21d becoming the working slot 21a is filled with materials, when the working slot 21a works, not only is the working slot 21a filled with materials, but the preparation slot 21d is also filled with the materials through the connection passage 15. In this way, once the preparation slot 21d communicates with the feed port 12, it becomes the working slot 21a, and at this moment, the working slot 21a is filled with materials, and correspondingly, the material flow passage 22 communicating with the working slot 21a is also filled with materials so as to guarantee that each two adjacent filter screen mounting grooves 21 that belong to the preparation slots 21d and become the working slots 21a do not need to consume the time of filling the working slots 21a with materials again to extrude the material, equivalent to implement "seamless connection", ensuring direct extrusion of materials when each filter screen mounting groove 21 and the feed port 12 correspondingly become the working slot 21a without wasting time; the structure design is ingenious and reasonable, and therefore, the usage effect is excellent.

As shown in FIG. 1 and FIG. 3 again, an auxiliary block 16 detachably connected with the external shell 10 is provided at the side of the external shell 10; the connection passage 15 includes an upper transverse passage 151 communicating with the working slot 21a, a lower transverse passage 153 communicating with the preparation slot 21d, and a vertical passage 152 communicating the upper transverse passage 151 and the lower transverse passage 153 and formed between the external shell 10 and the auxiliary block 16. Specifically, the connection passage 15 is a bend passage and is U-shaped inverted by 90°, where both the upper transverse passage 151 and the lower transverse passage 153 are formed on the external shell 10, and then a detachable auxiliary block 16 is added between the side surfaces of the external shell 10 to form a vertical passage 152 to communicate with the upper transverse passage 151 and the lower transverse passage 153 at intervals. Such structural design can perform required dredging work such as cleaning on the upper transverse passage 151, the vertical passage 152, and the lower transverse passage 153 through detaching the auxiliary block 16. The structural design is reasonable and has high operability.

In this embodiment, as shown in FIG. 1 and FIG. 3, the sealing wall 23 between adjacent filter screen mounting grooves 21 is used for separating the filter screen mounting grooves 21, avoiding material leakage due to pressure leakage, and meanwhile, the sealing wall 23 is hermetically connected with the internal wall of the internal cavity 11. The key point is: when parts of two adjacent filter screen mounting grooves 21 simultaneously communicate with the feed port 12 (e.g., the parts belonging to the working slot 21a and the preparation slot 21d simultaneously communicate with the feed port 12), and at this moment, parts of another two adjacent filter screen mounting grooves 21 simultaneously communicate with the screen changing port 14 (e.g., the parts belonging to the waste slot 21b and the screen changing slot 21c simultaneously communicate with the screen changing port 14); in this state, two symmetrical sealing walls 23 (as shown in FIG. 3) are hermetically in contact with the internal wall of the internal cavity 11, avoiding communicating the feed port 12 and the screen changing port 14 and preventing the pressure at the feed port 12 leaking from the screen changing port 14, so as to ensure effective prevention of material leakage. The structural design is ingenious.

In this embodiment, as shown in FIG. 2, the other end of the external shell 10 is provided with a sealing plate 17 for sealing an opening at one end of the material flow passage 22. Specifically, one end of the material flow passage 22 communicates with the discharge port 13 in the rotation process of the internal drum 20, and the other end of the material flow passage 22 is sealed by the sealing plate 17, preventing material leakage at this end; moreover, the internal drum 20 can be installed in the internal cavity 11 by opening the sealing plate 17, thereby facilitating product assembly, repair and maintenance.

In this embodiment, as shown in FIG. 1 and FIG. 3, the internal drum 20 includes partition walls 26 located between the material flow passages 22 and the corresponding filter screen mounting grooves 21 and provided with material flow holes 24, and the material flow holes 24 communicate the material flow passages 22 and the filter screen mounting grooves 21, where the partition walls 26 can assist in mounting the filter screens 40. Specifically, materials enter the filter screens 40 mounted in the filter screen mounting grooves 21 from the feed port 12 to be filtered, and the filtered materials enter the material flow passage 22 from the material flow holes 24 and finally flow out of an exit at the end from the material flow passage 22.

Figure 5:
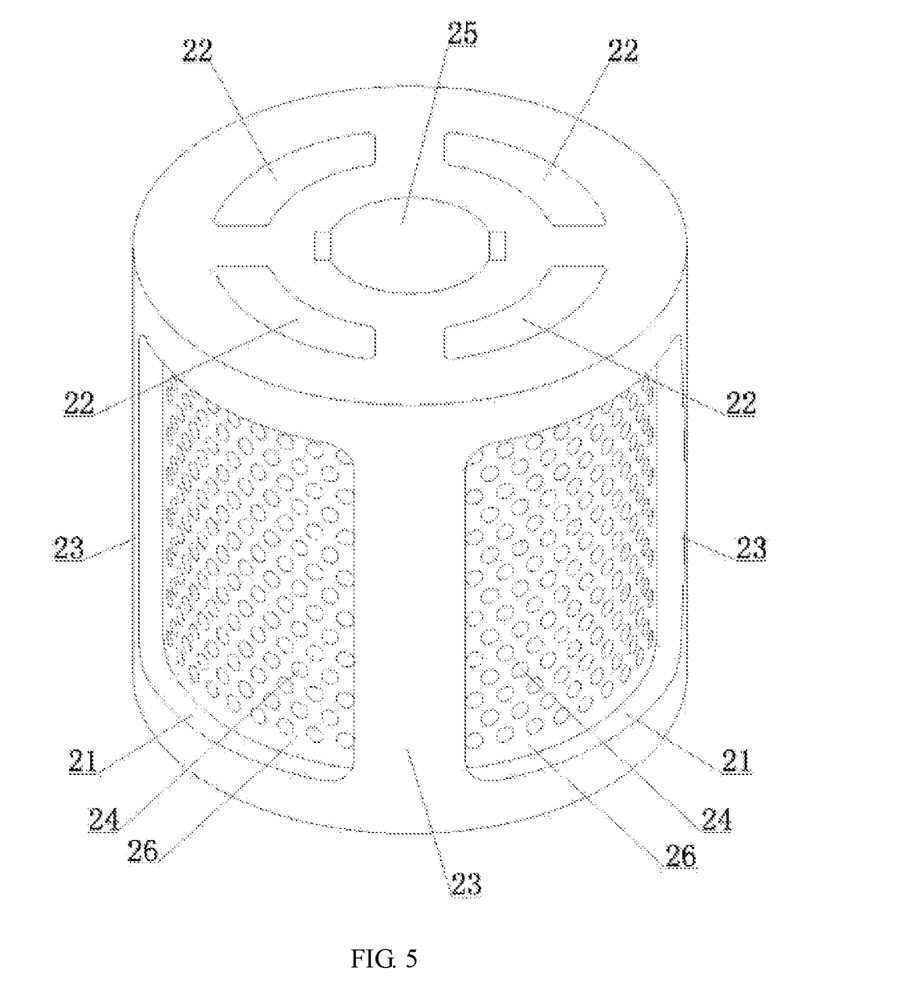
FIG. 5 is a structural schematic diagram of an internal drum of a continuous screen changer of the present application.

In this embodiment, the material flow holes 24 include several small round holes uniformly distributed in arrays. As shown in FIG. 5, specifically, the filter materials enter the material flow passage 22 from the several small round holes, avoiding aggregation of materials and affecting material extruding effect.

Figure 6:
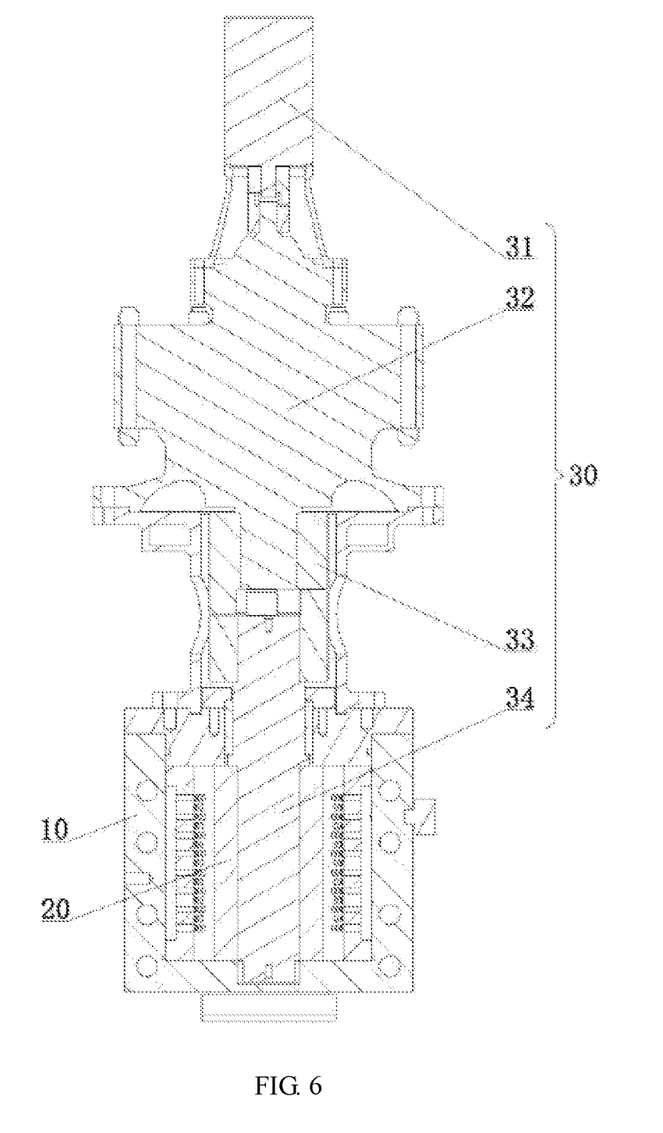
FIG. 6 is a section view of a screen changing device of the present application.

An embodiment of the present application also provides a screen changing device. As shown in FIG. 6, the screen changing device includes a driving mechanism 30 and the foregoing continuous screen changer; the driving mechanism 30 is connected with the internal drum 20 and drives the internal drum 20 to rotate relative to the external shell 10. The driving mechanism 30 can drive the internal drum 20 to rotate, then continuous change of the filter screens 40 mounted in the filter screen mounting grooves 21 can be implemented by the rotation of the internal drum 20.

The continuous screen changer in this embodiment has the same structure and function as the continuous screen changer in each of the foregoing embodiments, not described one by one herein.

In this embodiment, the driving mechanism 30 includes a motor 31, a reduction gear 32, a coupler 33 and a center shaft 34; a shaft hole 25 is formed in the middle part of the internal drum 20 along the axial direction; the center shaft 34 is cooperatively connected with the shaft hole 25; and a spindle of the motor 31 is connected with an input end of the reduction gear 32, and an output end of the reduction gear 32 is connected with the center shaft 34 through the coupler 33. Specifically, when the filter screens 40 need to be changed, the power of the motor 31 is reduced by the reduction gear 32 and then is transferred to the center shaft 34 via the coupler 33, and the center shaft 34 drives the internal drum 20 to rotate so that the position of one of the filter screen mounting grooves 21 corresponds to that of the feed port 12, and meanwhile, the position of another filter screen mounting groove 21 corresponds to that of the screen changing port 14. In this way, the filter screen 40 mounted in one filter screen mounting grooves 21 is maintained to work all the time, and the filter screen 40 mounted in one filter screen mounting groove 21 can be changed to implement the continuous and uninterrupted change of the filter screens 40, so that the apparatus to which the screen changing device is applied can continuously work.

An embodiment of the present application also provides an extruder (not shown), including an extrusion device (not shown) and the foregoing screen changing device. A discharge end of the extrusion device is connected with the feed port 12.

The screen changing device in this embodiment has the same structure and function as the screen changing device in each of the foregoing embodiments, not described one by one herein.

According to the extruder of this embodiment, since the foregoing screen changing device is used, the extrusion device does not need to be stopped during change of the filter screens 40, so that continuous and uninterrupted work can be implemented, thereby greatly improving production efficiency and production quality.

Finally, conclusions are made to the continuous screen changer, the screen changing device and the extruder of the present application:

I. The continuous screen changer of the present application solves the problem that the traditional plastic extruder needs to be stopped during change of the filter screens 40; in the process of changing the filter screens 40, it can be done without stopping the machine, and the material fluctuation is small. When the filter screens 40 are changed, the air does not enter the materials, which ensures the continuous production of the extrusion operation and also ensures qualified and stable products.

II. According to the continuous screen changer of the present application, N+4 filter screens 40 can be stored in the same external shell 10. The filter screens 40 are fixed in the filter screen mounting grooves 21, and the positions of the filter screen mounting grooves 21 for correspondingly placing the filter screens 40 in the internal drum 20 and the external shell 10 are respectively named as the working slot 21a, the waste slot 21b, the screen changing slot 21c, and the preparation slot 21d; the driving mechanism 30 is connected to the center shaft 34 through the coupler 33, the center shaft 34 drives the internal drum 20 to rotate, and the filter screens 40 are changed during the rotation of the internal drum 20; the preparation slot 21d is gradually filled with materials through the connection passage 15 between the external shell 10 and the internal drum 200 during the working of the working slot 21a, and the material pressure achieves pressure balance to the working slot 21a over time; during rotary change of the filter screens 40, the filter screen 40 in the original working slot 21a gradually stops to work and the filter screen 40 in the preparation slot 21d gradually starts to work. Since the preparation slot 21d is filled with materials and the material pressure is equal to the working slot 21a, the material interruption is not caused.

III. The extruder using the continuous screen changer of the present application does not need to be stopped during the change of the filter screens 40, materials would not be interrupted, and the product that needs to ensure the mold pressure would not be scrapped due to excessive fluctuation of material pressure. The process of changing the filter screens 40 is fully automated. The action of changing the filter screens 40 by the rotation of the internal drum 20 and the external shell 10 is an important design of the present application; generally, the change of the filter screens of the plastic extruder each time would cause economic loss about RMB30-50 Yuan; generally, the filter screens 40 need to be changed every 30 minutes to 2 hours; according to the 2-hour settlement, the economic loss of about RMB500 Yuan would be caused if the filter screens 40 are changed in the 24-hour work system. Therefore, the economic benefits resulting from the adoption of the present application are considerable.

In conclusion, the present application has the excellent characteristics above, so that the present application is practical to enhance the efficiency that has not been achieved by previous technologies in use to become a product with high practical value.

The foregoing descriptions are merely preferred embodiments of the present application, but are not intended to limit the present application. Any modification, equivalent replacement, or improvement made without departing from the spirit and principle of the present application shall fall within the protection scope of the present application.

The invention claimed is:

1. A continuous screen changer for changing filter screens, comprising:
an external shell having an internal cavity, and an internal drum accommodated in the internal cavity and configured to rotate relative to the external shell, wherein
the external shell is provided with a feed port and a screen changing port located at two opposite sidewalls of the external shell and communicating with the internal cavity, as well as a discharge port located at one end of the external shell and communicating with the internal cavity;
the internal drum is provided with at least four filter screen mounting grooves uniformly distributed at a peripheral surface of the internal drum for mounting the filter screens, and material flow passages corresponding to the filter screen mounting grooves in position and communicating with the filter screen mounting grooves, respectively; a sealing wall hermetically connected with an internal wall of the internal cavity is formed between each two adjacent filter screen mounting grooves;
after entering the internal cavity along the feed port and being filtered by the filter screens, materials flow out of the discharge port along the material flow passages in a filtering process;
whichever of the filter screen mounting grooves that is opposite to the feed port rotates to be opposite to the screen changing port in a rotation process, and whichever of the filter screens that is on said filter screen mounting groove opposite to the screen changing port is changed at the screen changing port;
the filter screen mounting grooves collectively comprise: a working slot communicating with the feed port during rotation of the internal drum, a screen changing slot opposite to the working slot and communicating with the screen changing port for changing whichever of the filter screens that is on said filter screen mounting groove opposite to the screen changing port, a preparation slot and a waste slot, the preparation slot and waste slot being located between the working slot and the screen changing slot;
the external shell is further provided with a connection passage for communicating the working slot and the preparation slot;
an auxiliary block detachably connected with the external shell is provided at the side of the external shell; and
the connection passage comprises an upper transverse passage communicating with the working slot, a lower transverse passage communicating with the preparation slot, and a vertical passage communicating the upper transverse passage and the lower transverse passage and formed between the external shell and the auxiliary block.

2. The continuous screen changer according to claim 1, wherein the other end of the external shell is provided with a sealing plate for sealing an opening at one end of each of the material flow passages.

3. The continuous screen changer according to claim 1, wherein the internal drum comprises partition walls located between the material flow passages and the corresponding filter screen mounting grooves and provided with material flow holes, and the material flow holes communicate the material flow passages and the filter screen mounting grooves.

4. The continuous screen changer according to claim 3, wherein the material flow holes comprise round holes uniformly distributed in arrays.

5. A screen changing device, comprising a driver and the continuous screen changer according to claim 1, wherein the driver is connected with the internal drum and drives the internal drum to rotate relative to the external shell.

6. The screen changing device according to claim 5, wherein the driver comprises a motor, a reduction gear, a coupler and a center shaft; a shaft hole is formed in a middle part of the internal drum along the axial direction; the center shaft is cooperatively connected with shaft hole; and a spindle of the motor is connected with an input end of the reduction gear, and an output end of the reduction gear is connected with the center shaft through the coupler.

* * * * *